United States Patent
Cai

(10) Patent No.: US 6,916,030 B2
(45) Date of Patent: Jul. 12, 2005

(54) LIGHTWEIGHT KNUCKLE WITH IN-CAST SPINDLE

(75) Inventor: Haimian Cai, Ann Arbor, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 152 days.

(21) Appl. No.: 10/313,833

(22) Filed: Dec. 6, 2002

(65) Prior Publication Data

US 2004/0108675 A1 Jun. 10, 2004

(51) Int. Cl.$^7$ ................................................. B62D 7/18
(52) U.S. Cl. ................................................. 280/93.512
(58) Field of Search .................. 280/93.512, 93.51, 280/89.1, 124.11, 124.113, 124.125; 29/34 R, 33 C, DIG. 5

(56) References Cited

U.S. PATENT DOCUMENTS

| | | | | |
|---|---|---|---|---|
| 1,502,659 A | * | 7/1924 | Carlson | 384/396 |
| 3,801,124 A | * | 4/1974 | Afanador et al. | 280/93.512 |
| 3,908,480 A | * | 9/1975 | Afanador et al. | 74/511 R |
| 4,352,528 A | * | 10/1982 | Guimbretiere | 384/512 |
| 4,722,540 A | * | 2/1988 | Kozyra et al. | 280/124.136 |
| 4,761,018 A | * | 8/1988 | Abbruzzi et al. | 280/124.145 |
| 5,199,730 A | * | 4/1993 | Westfall et al. | 280/93.512 |
| 5,263,731 A | * | 11/1993 | Deutschel | 280/124.145 |
| 5,458,352 A | * | 10/1995 | Lederman | 280/124.125 |
| 5,507,094 A | * | 4/1996 | Lederman | 29/898.061 |
| 5,785,109 A | * | 7/1998 | Hongawa | 164/59.1 |
| 5,785,332 A | | 7/1998 | Pollock et al. | |
| 5,868,409 A | | 2/1999 | Breuer | |
| 6,138,357 A | * | 10/2000 | Jones | 29/897.2 |
| 6,311,996 B1 | | 11/2001 | Kato et al. | |
| 6,565,159 B1 | * | 5/2003 | Kosak | 301/132 |
| 6,729,633 B1 | * | 5/2004 | Irwin | 280/86.75 |
| 6,736,418 B2 | * | 5/2004 | Wang | 280/93.512 |

FOREIGN PATENT DOCUMENTS

JP          62107854 A      *  5/1987

* cited by examiner

Primary Examiner—David R. Dunn
(74) Attorney, Agent, or Firm—Brinks Hofer Gilson & Lione

(57) ABSTRACT

An independent vehicle suspension includes a knuckle assembly supported by control arms or links. The knuckle assembly includes a forged, elongated steel spindle, one end of which includes a pair of axially-spaced radial flanges separated by a radially-enlarged shank portion. The knuckle assembly further includes an aluminum knuckle body defining at least one attachment point for the links. The knuckle assembly is formed by insert-casting the knuckle body about the shank portion of the spindle to thereby fully encapsulate the shank portion within, and at least partially encircle an axial portion of each spindle flange with, the as-cast knuckle body. A radial shoulder, for example, machined on the spindle's outboard end proximate to the outboard flange, axially supports the inner race of a bearing assembly, thereby advantageously reducing wheelend run-out. One or more peripheral flats on either spindle flange resists torsion, thereby allowing the machining of spindle surfaces after insert-casting.

19 Claims, 2 Drawing Sheets

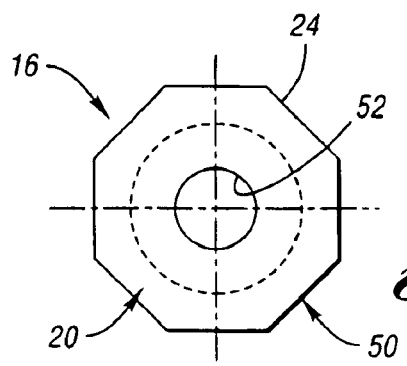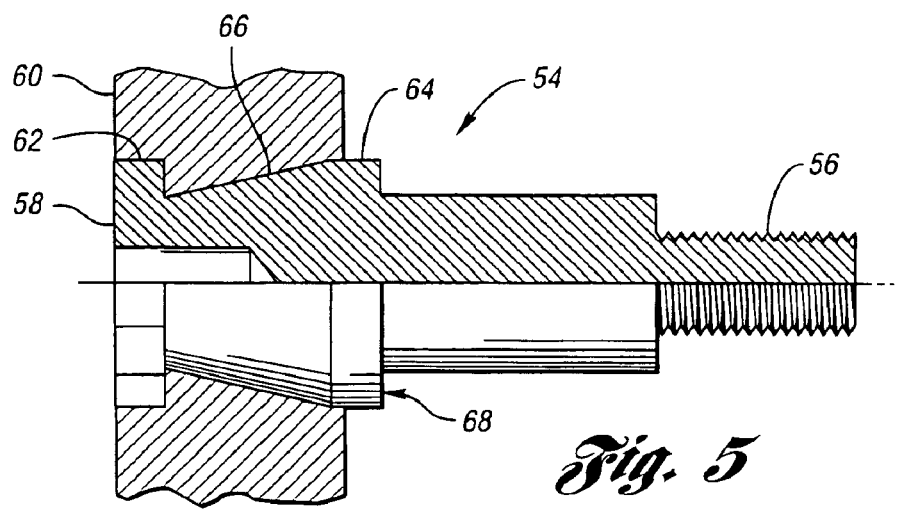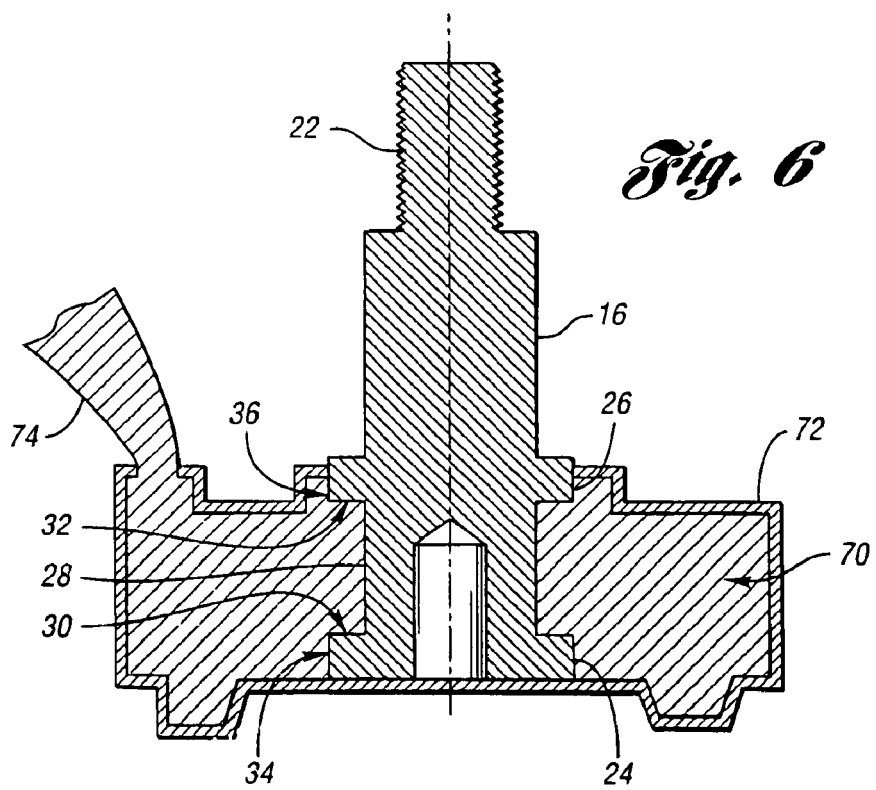

LIGHTWEIGHT KNUCKLE WITH IN-CAST SPINDLE

FIELD OF INVENTION

The invention relates to an automotive suspension knuckle assembly for supporting a wheelend assembly.

BACKGROUND OF THE INVENTION

The prior art teaches knuckle assemblies for use in automotive suspensions in which a cast, stamped, or forged knuckle body is provided with a toleranced bore within which to receive a precisely-machined inboard end of an elongated cast or forged spindle. The spindle is inserted within the bore of the knuckle body and thereafter typically maintained in the knuckle body by virtue of a press or shrink (interference) fit achieved between the bore and the machined end of the spindle.

Unfortunately, this prior art approach requires the machining of both the knuckle body bore and the inboard end of the spindle to rather high tolerances, thereby increasing manufacturing costs. Moreover, the resulting interference between the installed spindle and the knuckle body is further characterized by a relatively limited ability to resist the application of an applied torque, as might be experienced if the outboard (cantilevered) end of the spindle was machined after the spindle is installed in the knuckle body. As a result, the prior art press-fit and shrink-fit approaches necessarily require that the outboard end of the spindle also be machined to a desired surface contour and dimensional tolerance before the spindle is installed in the knuckle body.

SUMMARY OF THE INVENTION

In accordance with the invention, a knuckle assembly for a vehicle suspension adapted to support a bearing race of a wheelend assembly includes an elongated spindle formed, for example, of a cast or forged steel that is mechanically captured within a cast knuckle body. The spindle, which is conveniently made of a cast or forged steel, includes an inboard end having a first radial flange and a shank portion proximate to the first flange. The knuckle body is insert-cast about the shank portion of the spindle such that the as-cast knuckle body is contiguous with a first face of the first flange and the shank portion, whereby a mechanical interlock is achieved between the spindle and knuckle body.

The spindle further includes an outboard having a radial shoulder that defines both a planar first surface adapted to axially support the bearing race of the wheelend assembly, and a cylindrical second surface adapted to radially support the bearing race. Preferably, where the knuckle body is cast of aluminum, the radial shoulder is axially spaced from the shank portion of the spindle such that the typically steel bearing race is maintained at least a minimum distance from the as-cast aluminum knuckle body, whereby galvanic action between the bearing race and the knuckle body is advantageously avoided.

In a preferred embodiment, an axial face and at least a portion of a peripheral surface of the first flange is captured within the as-cast knuckle body to provide an improved mechanical interlock. Further, the peripheral surface of the first flange preferably includes a peripheral flat or other noncylindrical characteristic, such that the spindle is able to resist relative torsional movement of the spindle within the as-cast knuckle body. In this manner, the invention advantageously provides a mechanical interlock is achieved between the peripheral surface of the spindle and the as-cast knuckle body that features improved resistance to a relative rotation of the spindle within the as-cast knuckle body.

In accordance with another aspect of the invention, in a preferred embodiment, the inboard end of the spindle includes a second radial flange that is axially-spaced from the first flange and is proximate to the shank portion of the spindle, and the knuckle body is cast such that the as-cast knuckle body is contiguous with a respective, opposed face of each flange to thereby achieve an improved axial interlock between the spindle and the as-cast knuckle body. When the spindle is provided with such a second flange, it will be appreciated that the radial shoulder of the outboard end of the spindle is advantageously defined by the second face of the second flange as it projects from the as-cast knuckle body.

In accordance with yet another feature of the invention, the first spindle surface adapted to axially support the bearing race of the wheelend assembly has a first dimensional tolerance, while the shank portion of the spindle has a second dimensional tolerance substantially lower than the first dimensional tolerance. By way of example, the invention advantageously lowers manufacturing costs by using an as-cast or as-forged surface finish on the captured shank portion of the spindle, thereby requiring a precisely-machined finish only on the outboard end of the spindle that supports the bearing race.

Under the invention, a method is also provided for making a knuckle assembly for a vehicle suspension that includes the steps of inserting a first end of an elongated spindle into a molding cavity of a casting mold such that a first radial flange and an adjacent shank portion of the spindle are disposed within the molding cavity, while a second end of the spindle extends through the casting mold away from the mold cavity. The method also includes insert-casting a knuckle body within the molding cavity such that the as-cast knuckle body is contiguous with the shank portion, a first face of the first flange, and at least a portion of a peripheral surface of the first flange. The method further includes machining the second end of the spindle to thereby provide a finished radial shoulder on the second end of the spindle, with the shoulder defining a first surface adapted to axially support the bearing race of the wheelend assembly and a finished cylindrical surface adapted to radially support the bearing race of the wheelend assembly.

In a preferred method wherein the spindle includes a second radial flange axially-spaced from the first flange and adjacent to the shank portion, the inserting step places a first face of the second flange and at least a portion of a peripheral surface of the second flange within the molding cavity. A preferred method further includes forming a peripheral flat or other noncylindrical characteristic on the peripheral surface of at least one flange, whereby the spindle is mechanically rotationally locked within the knuckle body to thereby resist the application of a torque.

Because the spindle is mechanically rotationally locked within the as-cast knuckle body, the invention advantageously may further include machining the bearing-supporting first surface of the spindle subsequent to insert-casting, thereby improving the relative alignment of the spindle/radial shoulder with a plurality of attachment points that are themselves defined on the as-cast knuckle body. Alternatively, the invention contemplates machining the bearing-supporting surfaces on the outboard end of the spindle before the spindle is insert-cast into the knuckle body, whereupon certain features of the knuckle body may thereafter be machined with reference to the pre-established spindle surfaces. By way of example, under-the alternative approach, suitable bores in the knuckle body for use with the links and defining a brake caliper mount are easily machined after casting with respect to the in-cast spindle to achieve close tolerances with respect to the spindle axis.

In accordance with yet another aspect of the invention, the finished shoulder on the spindle is machined to a higher dimensional tolerance than the shank portion to thereby advantageously reduce wheelend assembly run-out. Indeed, under the invention, the shank portion is preferably maintained in an as-cast or as-forged surface finish, thereby advantageously reducing the amount of machining that must be performed on the spindle.

Additional benefits and advantages of the invention will become apparent to those skilled in the art to which the present invention relates from the subsequent description of the preferred embodiment and the appended claims, taken in conjunction with the accompanying drawings.

BRIEF DESCRIPTION OF THE DRAWINGS

FIG. 4 is an end view of the spindle before the spindle is in-cast within the knuckle body of the first knuckle assembly;

FIG. 5 is a sectional view of an exemplary second knuckle assembly incorporating a spindle having an alternative shank configuration; and FIG. 6 is a partially diagrammatic view of a method in accordance with the invention for making a knuckle assembly for a vehicle suspension.

DETAILED DESCRIPTION OF THE PREFERRED EMBODIMENT

Figure 3:
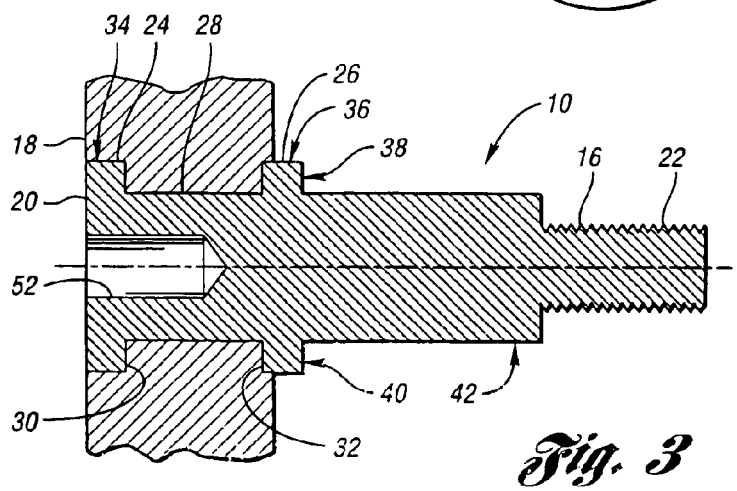
FIG. 3 is a sectional view of the first knuckle assembly, taken along line 3—3 of FIG. 2.

Referring to FIGS. 1–4, an exemplary first knuckle assembly 10 for a vehicle suspension adapted to support a bearing race 12 of a wheelend assembly 14 includes an elongated spindle 16 that is mechanically captured within a cast knuckle body 18. As best seen in FIG. 3, the spindle 16, which is conveniently cast or forged from any suitable material such as a nodular iron or steel, includes a first, "inboard" end 20 and a second, "outboard" end 22. The inboard end 20 of the spindle 16 is provided with a pair of axially-spaced radial flanges 24, 26, separated by a generally-right-cylindrical shank portion 28.

As illustrated in partial section in FIG. 3, the knuckle body 18 is insert-cast about the shank portion 28 of the spindle 16 such that the as-cast knuckle body 18 is contiguous with each of a first face 30 of the inboard flange 24, an opposed first face 32 of the outboard flange 26, and the shank portion 28, whereby a mechanical interlock is achieved between the spindle 16 and as-cast knuckle body 18. And, as seen in FIG. 3, to ensure the contiguity of the as-cast knuckle body with the opposed faces 30,32 of the flanges 24,26, the knuckle body 18 is preferably cast so as to be contiguous with at least a portion of a respective peripheral surface 34,36 of each flange 24,26.

While the knuckle body 18 is cast of any suitable material, to advantageously provide the first knuckle assembly 10 with a reduced weight and, hence, provide the vehicle incorporating the first knuckle assembly 10 with a reduced unsprung wheelend mass, the knuckle body 18 is formed of a cast aluminum alloy, such as A356. It will be appreciated that the invention contemplates use of lightweight cast materials in place of aluminum.

Figure 1:
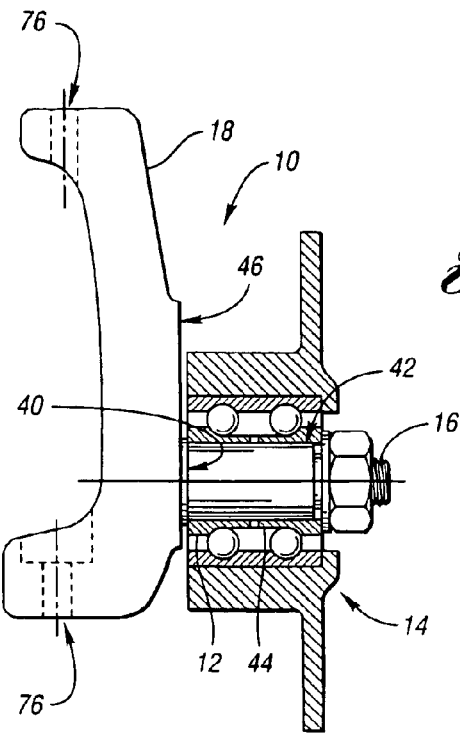
FIG. 1 is a side elevation of an exemplary first knuckle assembly for an independent vehicle suspension in accordance with the invention, also showing in partial axial section a supported wheelend assembly.
Figure 2:
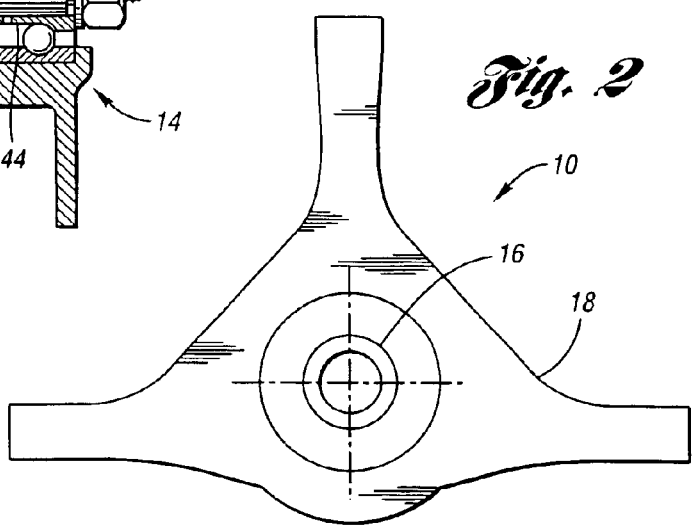
FIG. 2 is a front elevation of the first knuckle assembly of FIG. 1.

As best seen in FIGS. 1 and 3, the outboard end 22 of the spindle 16 further includes a radial shoulder 38 that defines a planar and annular first surface 40 adapted to axially support the inboard inner bearing race 12 of the wheelend assembly 14, and a cylindrical second surface 42 adapted to radially support the inboard and outboard inner bearing races 12, 44. The first surface 40 is machined to a relatively high tolerance to thereby advantageously reduce wheelend assembly run-out. To avoid galvanic action between the typically-steel inboard inner bearing race 12 and the aluminum knuckle body 18, the radial shoulder 38 is axially spaced from the shank portion 28 of the spindle 16 such that the inboard inner bearing race 12 is maintained at least a minimum distance from the adjacent outboard surface 46 of the as-cast aluminum knuckle body 18. In the first knuckle assembly 10, the radial shoulder 38 is conveniently defined by the outboard annular face of the spindle's outboard flange 26.

In accordance with an aspect of the invention, the first surface 40 on the outboard end 22 of the spindle 16, adapted to axially support the bearing race 12, is machined to a higher dimensional to erance than the shank portion 28. Indeed, under the invention, the shank portion 28 is conveniently maintained in an as-cast or as-forged surface finish, or nearly so, thereby advantageously reducing the amount of machining that must be performed on the spindle 16. In this regard, it is noted that an as-forged surface is likely preferred over an as-cast surface, in part due to its relatively lesser surface porosity.

In accordance with another aspect of the invention, and as illustrated in FIG. 4, the peripheral surface 34 of the spindle's inboard flange 24 includes a plurality of flats 50 that provide the peripheral surface 34 with a noncylindrical characteristic. Because the knuckle body 18 is cast in contiguity with at least a portion of these peripheral surface flats 50, a mechanical interlock is achieved between the peripheral surface flats 50 of the spindle 16 and the as-cast knuckle body 18 that features improved resistance to a relative rotation of the spindle 16 within the as-cast knuckle body 18. FIG. 4 also shows an axial bore 52 formed in the inboard end of the spindle 16, which advantageously serves to further reduce the overall weight of the first knuckle assembly 10.

An exemplary second knuckle assembly 54 is illustrated in partial cross-section in FIG. 5. The second knuckle assembly 54 similarly includes an elongated spindle 56 whose inboard end 58 is captured in a cast knuckle body 60. As in the first knuckle assembly 10, the second knuckle assembly's spindle 56 includes an inboard flange 62 and an outboard flange 64, separated by a "cylindrical" shank portion 66 having the shape of a conical frustum. As in the first knuckle assembly 10, the annular first surface 68 that axially supports the inner race of the bearing assembly (not shown) is conveniently defined on the spindle's outboard flange 64, opposite the frustoconical "face" of the flange 26 defined by the spindle's shank portion 66.

FIG. 6 illustrates the insert-casting of the knuckle body 18 of the first knuckle assembly 10 about the "as-forged" inboard end 20 of the spindle 16. Specifically, the inboard end 20 of the spindle 16 is inserted into a molding cavity 70 of a casting mold 72 such that the inboard flange 24, the shank portion 28, and a portion of the outboard flange 26 are each disposed within the molding cavity 70, while the outboard end 22 of the spindle 16 extends through the casting mold 72 away from the mold cavity 70. The aluminum knuckle body material 74 is then directed into the molding cavity 70 such that the as-cast knuckle body 18 is contiguous with the inboard flange's peripheral surface 34 and adjacent face 30, the shank portion 28, the outboard flange's adjacent face 32, and a portion of the outboard flange's peripheral surface 36.

After the as-cast knuckle body 18 is removed from the casting mold 72, the knuckle body 18 is fixtured and the spindle's outboard end 22 is machined to a desired dimensional tolerance and surface finish to the spindle's bearing-supporting first and second surfaces 40, 42. It will be appreciated that the robust mechanical interlock achieved between the spindle 16 and the as-cast knuckle body 18 advantageously permits the post-casting machining of the outboard end 22 of the spindle 16, thereby improving the relative alignment of the spindle's bearing-supporting surfaces 40, 42 with a plurality of attachment points 76 that are themselves defined on the as-cast knuckle body 18 (as seen in FIG. 1).

It will be appreciated, however, that the invention contemplates machining the outboard end 22 of the spindle 16 prior to insert-casting, where desired, for example, to otherwise define the peripheral surface flats 50 or other noncylindrical peripheral characteristic on the inboard flange 24. As noted above, under the invention, the shank portion 28 of the spindle 16 is preferably maintained in an as-cast or as-forged surface finish, thereby advantageously reducing the amount of machining that must be performed on the spindle 16.

While the above description constitute the preferred embodiments, it will be appreciated that the invention is susceptible to modification, variation and change without departing from the proper scope and fair meaning of the subjoined claims.

I claim:

1. A knuckle assembly for a vehicle suspension, the knuckle assembly comprising:
    an elongated spindle having an outboard end and an inboard end, wherein the inboard end includes a first radial flange and a shank portion proximate to the first flange, and wherein the outboard end includes a radial shoulder defining a planar first surface adapted to axially support the bearing race, and a cylindrical second surface adapted to radially support a bearing race; and
    a knuckle body insert-cast about the shank portion of the spindle, wherein the as-cast knuckle body is contiguous with a first face of the first flange and the shank portion.

2. The knuckle assembly of claim 1, wherein the shank portion is cylindrical.

3. The knuckle assembly of claim 2, wherein the shank portion is generally cylindrical and is concentric about a longitudinal axis of the spindle.

4. The knuckle assembly of claim 1, wherein the spindle includes a second radial flange proximate to the shank portion of the spindle and axially spaced from the first flange, the first and second flanges being integrally formed on the spindle.

5. The knuckle assembly of claim 4, wherein a first face of the second flange is in axial opposition with the first face of the first flange; and wherein the as-cast knuckle body is contiguous with the first face of the second flange.

6. The knuckle assembly of claim 4, wherein the as-cast knuckle body defines a knuckle body surface proximate to the second flange of the spindle, and wherein the second flange has a second face opposite to the first face, the second face of the second flange being axially spaced from the knuckle body surface.

7. The knuckle assembly of claim 6, wherein the first surface of the outboard end of the spindle is defined by the second face of the second flange.

8. The knuckle assembly of claim 1, wherein the first surface of the spindle adapted to axially support the bearing race has a first dimensional tolerance, and wherein the shank portion of the spindle has a second dimensional tolerance substantially lower than the first dimensional tolerance.

9. The knuckle assembly of claim 8, wherein the first surface of the spindle is finished in a machining operation.

10. A knuckle assembly for a vehicle suspension, the knuckle assembly comprising:
    an elongated spindle having an outboard end and an inboard end, wherein the inboard end includes a first radial flange and a shank portion proximate to the first flange, and wherein the outboard end includes a radial shoulder defining a planar first surface adapted to axially support the bearing race, and a cylindrical second surface adapted to radially support a bearing race; and
    a knuckle body insert-cast about the shank portion of the spindle, wherein the as-cast knuckle body is contiguous with a first face of the first flange and the shank portion,
    wherein the spindle includes a second radial flange proximate to the shank portion of the spindle and axially spaced from the first flange, and wherein one of the first and second flanges has a peripheral surface, and wherein the as-cast knuckle body is contiguous with at least a portion of the peripheral surface of the one flange.

11. The knuckle assembly of claim 10, wherein the peripheral surface of the one flange includes a peripheral flat, and wherein the as-cast knuckle body is contiguous with at least a portion of the peripheral flat, whereby a mechanical interlock is achieved between the peripheral surface of the spindle and the as-cast knuckle body to resist relative rotation of the spindle within the as-cast knuckle body.

12. The knuckle assembly of claim 10, wherein the peripheral surface of the one flange is noncylindrical, whereby the one flange resists relative rotation of the spindle within the as-cast knuckle body.

13. The knuckle assembly of claim 12, wherein the spindle is a casting, and wherein the shank portion of the spindle is a substantially as-cast surface.

14. The knuckle assembly of claim 12, wherein the spindle is a casting, and wherein the shank portion of the spindle is a substantially as-forged surface.

15. A method for making a knuckle assembly for an independent vehicle suspension, the method comprising:
    inserting an elongated spindle into a molding cavity of a casting mold such that a first radial flange on the spindle proximate to a first end of the spindle and a shank portion of the spindle adjacent to the first flange are disposed within the molding cavity, whereby a second end of the spindle extends through the casting mold away from the mold cavity;
    insert-casting a knuckle body within the molding cavity such that the as-cast knuckle body is contiguous with the shank portion, a first face of the fist flange, and at least a portion of a peripheral surface of the first flange; and machining the second end of the spindle to thereby provide a finished radial shoulder on the second end of the spindle, the shoulder defining a first surface adapted to axially support a bearing race and a finished cylindrical surface adapted to radially support the bearing race.

16. The method of claim 15, wherein the spindle includes a second radial flange axially-spaced from the first flange and adjacent to the shank portion, and wherein inserting places a first face of the second flange and at least a portion of a peripheral surface of the second flange within the molding cavity.

17. The method of claim 15, including forming a peripheral flat on the peripheral surface of the first flange.

18. The method of claim 15, wherein machining the radial shoulder of the spindle is performed subsequent to insert-casting.

19. The method of claim 15, wherein the finished shoulder is machined to a higher dimensional tolerance than the shank portion.

* * * * *